Nov. 11, 1952     H. GUTTON ET AL     2,617,968

MAGNETRON TUBE

Filed July 8, 1947     2 SHEETS—SHEET 1

INVENTORS:
HENRI GUTTON
AND JEAN LEGROS
By John B. Brady
attorney

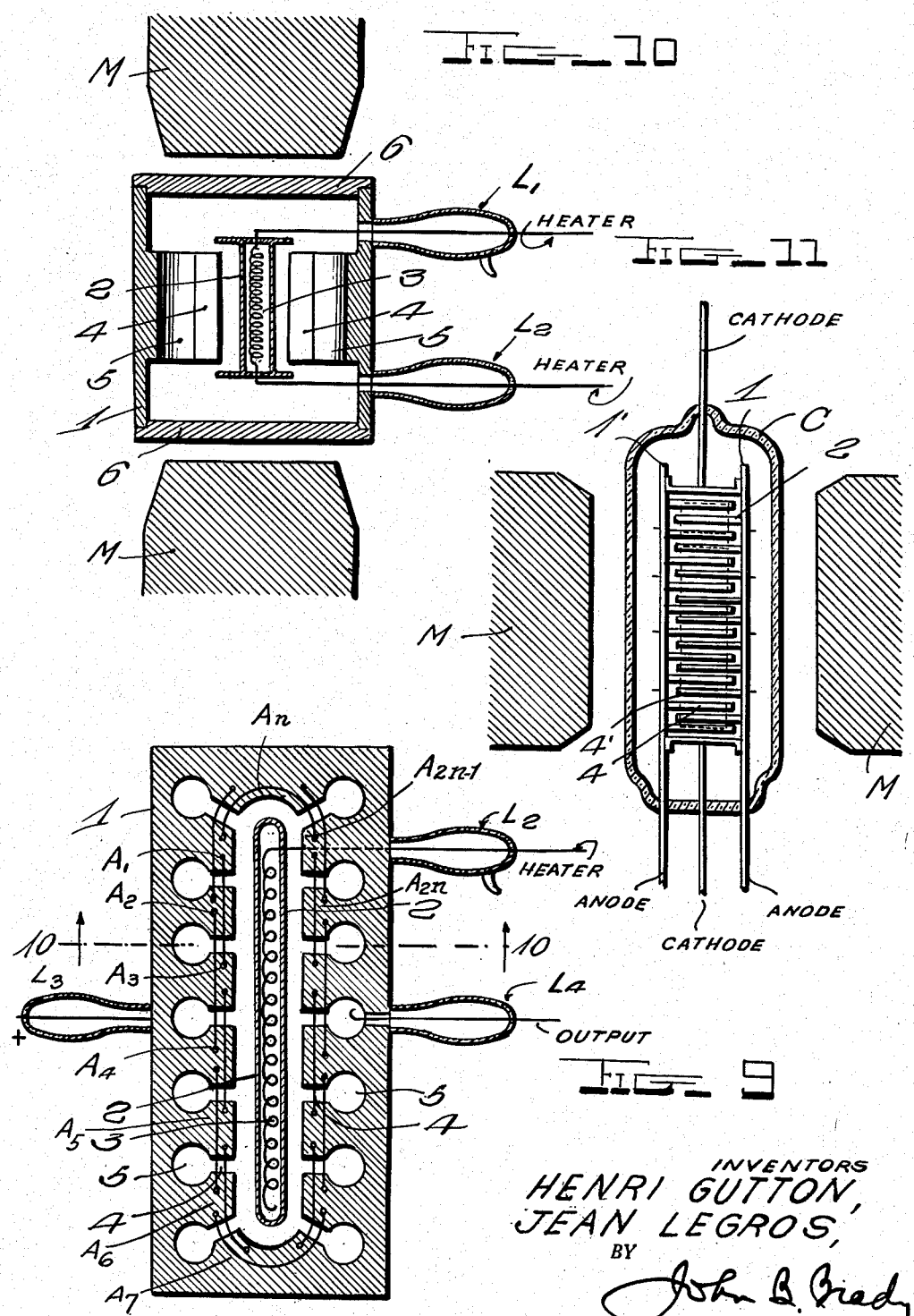

Patented Nov. 11, 1952

2,617,968

UNITED STATES PATENT OFFICE 2,617,968

MAGNETRON TUBE

Henri Gutton and Jean Legros, Paris, France, assignors to Compagnie Generale de Telegraphie Sans Fil, a corporation of France Application July 8, 1947, Serial No. 759,664
In France September 28, 1946

2 Claims. (Cl. 315—40)

The magnetrons usually utilized have the form of surfaces of revolution about the axis of the cathode. It is easy to show that this arrangement has serious disadvantages in practice. In point of fact, if the operation of these appliances is examined, it will be found that the maintenance of oscillations of very high frequency with an acceptable output or efficiency is not possible unless the magnetic field acting upon the electronic trajectories is sufficiently high.

By way of example, with a familiar type of apparatus, a wave length of 20 centimetres is obtained with a high output or efficiency for a magnetic field of the order of 500 oersteds. There would similarly be obtained:

15 centimetres for a field of 1000 oersteds
10 centimetres for a field of 1800 oersteds
5 centimetres for a field of 3000 oersteds
1 centimetre for a field of 10,000 oersteds.

These figures are experimental, and merely give an order of magnitude.

In order to obtain high magnetic fields, the air gap of the magnet or electromagnet may be reduced, which limits the length of the anode and of the cathode.

On the other hand the operating anode voltage is bound up with the magnetic field by a relation of the form: $V=kH^2$, the coefficient $k$ being a function of the interval $a$ between the surface of the cathode and the anode. This latter function is to a first approximation of the form: $k=\alpha a^2$, $\alpha$ being a constant.

To sum up, V is approximately equal to $\alpha(aH)^2$. It results from this formula that V increases rapidly when $aH$ increases. Now it is necessary to prevent V attaining values which would not be acceptable in practice. One is therefore led, with the high values of H that are necessary for the maintenance of very high frequencies, to reduce greatly the distance $a$ between the electrodes. If the magnetron has the symmetrical form of a surface of revolution, the surface of the anode tends therefore to diminish, the dissipation of heat becomes more difficult, and one is obliged to reduce the useful power furnished.

The present invention, which is based on the Gutton and Legros system, relates to a type of magnetron which enables large powers to be obtained while to a sufficient extent reducing the distance between anode and cathode. This result is obtained by giving the surface of the anode a special form, which comprises two parallel planes united at both ends by a cylindrical surface, the cathode itself extending over a substantial area.

The invention will be better understood by the aid of the following description, which, in conjunction with the accompanying drawings, furnishes an example of construction, the features set forth in the text and in the drawings constituting of course part of the invention, though the latter is not restricted to the embodiments illustrated.

In the drawings,

Fig. 9 is a detailed view showing the relation of the anode and cathode in a complete magnetron assembly embodying our invention;

Fig. 10 is a transverse sectional view taken substantially on line 10—10 of Fig. 9; and Fig. 11 is a view illustrating a complete assembly of a magnetron embodying the cathode and anode arrangement of Fig. 4a and Fig. 4b.

Figure 1:
Figure 1 is a cross sectional view taken through the anode and cathode unit employed in the tube of our invention.

Fig. 1 shows a cross-section through the unit comprising the anode and the cathode, the section being taken perpendicularly to the generating lines of the anode 1, which is in the shape of a greatly flattened cylinder. The cathode 2 is plane, and includes a heating element 3, formed for example of helical resistance wires.

As in ordinary magnetrons, the positive pole of a high tension source is connected to the anode 1, and the negative pole to the cathode 2. On the other hand a permanent magnet or an electromagnet maintains a magnetic field, the lines of force of which are perpendicular to the plane of the figure. These appliances, being of a standard type, are not illustrated.

In this first arrangement the whole of the cathode emits primary electrons, owing to the rise of temperature. Now it is known that under the influence of the magnetic field the electrons describe curved trajectories, and may return to the cathode. If they strike the latter at a suitable angle they effect the detachment of secondary electrons, which in their turn participate in the operation of the magnetron. The number of secondary electrons may moreover become considerable, and may considerably exceed the number of primary electrons.

The heating may therefore be limited to certain parts of the cathode, which are to furnish the primary electrons, the remainder intervening merely in order to serve as a target and produce the secondary emission. Moreover after the operation has proceeded for a certain length of time the bombardment produced by the electrons returning to the cathode is sufficient to maintain an appropriate electronic emission, and the heating may then be entirely discontinued.

Figure 2:
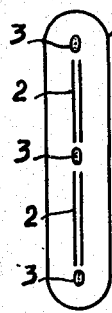
Fig. 2 shows a modified form of cathode and anode unit showing the principles of our invention.

Fig. 2 shows a cross-section through a unit comprising an anode and a cathode according to the invention, wherein the principles that have just been set forth are applied. The plates 2, which may be formed of two elements applied to one another, constitute the greater part of the cathode. They may for example be made of an alloy of copper and beryllium, or may be formed of a suitable metallic support covered with oxides of barium. The electrodes 3, which alternate with the plates 2, each comprise a heating element, which enables their temperature to be raised, at least at the commencement of operation, in such a way as to produce the initial primary electrons which strike the targets 2.

Figure 6:
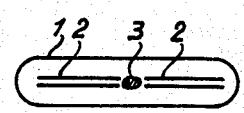
Fig. 6 shows a further modified form of cathode and anode construction in accordance with our invention.
Figure 7:
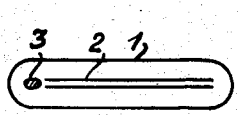
Fig. 7 shows a further modified arrangement of cathode and anode construction employing secondary emission.
Figure 8:
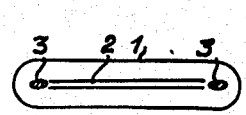
Fig. 8 illustrates another modified form of cathode and anode construction according to our invention and employing secondary emission.

Figures 6, 7 and 8 represent other examples of construction, in which the heated elements 3 and the targets 2 serving for the secondary emission are differently distributed.

In order to convert the energy of the electrons into electromagnetic energy, it is possible, as in ordinary magnetrons, to utilize one of the two following methods:

(1) To provide in the conducting mass of the anode, slits opening into resonant cavities; or (2) To provide the anode with resonant lines constituted by a series of claws fixed to the two sides of the anode alternately.

Figure 3:
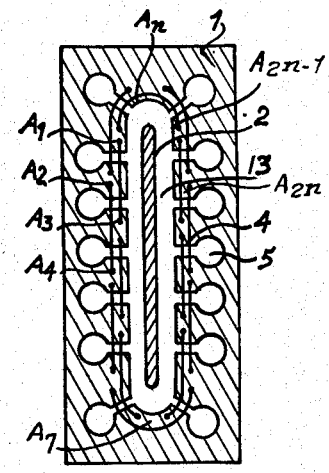
Fig. 3 is a cross sectional view through a magnetron employing the principles of our invention.

Fig. 3 represents diagrammatically the first of these solutions, the magnetron being seen in cross-section, as in the preceding views. The anode is formed of a rectangular parallelopiped 1 of conducting metal. In a large central cavity 13 is lodged the cathode 2, the heating of which, as explained above, may be either uniform, or localized in elements.

Over the periphery of the large central cavity 13 are distributed a certain number of slits 4, the greater dimension of which is perpendicular to the plane of the drawing. Each slit 4 opens into a small cylindrical cavity 5, the height of which is likewise perpendicular to the plane of the drawing. It is known that under these conditions the vortex motion of the electrons about the cathode maintains oscillations of very high frequency in the little cavities 5. The cavities 5 may moreover be of forms different from that of cylinders having a circular base.

Figure 4A:
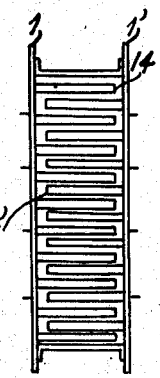
Fig. 4a and Fig. 4b are views showing the application of the principles of our invention to a modified form of magnetron.
Figure 4B:
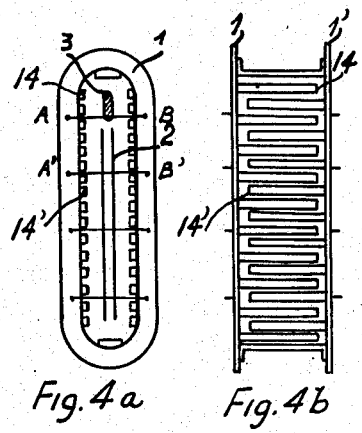

Fig. 4 diagrammatically represents the second solution as described in French application 745,322 filed March 16, 1938, now Patent No. 835,305, published December 19, 1938, corresponding to United States Patent 2,147,159, granted February 14, 1939. The magnetron 4 is shown in front view and in profile in the parts $a$ and $b$ respectively of Fig. 4. The anode here consists of two plates 1 and 1'. The cathode comprises for example a heating element 3 and a target 2, which emits secondary electrons. A series of small claws 14 and 14' are attached to the plates 1 and 1' respectively, and interengage with one another as indicated in the drawing. These claws behave like so many resonant elements, the vibration of which is excited by the motion of the electrons.

Of course it is always assumed that a magnetic field is maintained, the lines of force of which are perpendicular to the plane of Figs. 3 and 4a. On the other hand the anode 1 is in both cases connected to the positive pole of a source of continuous or pulsating high-tension voltage, the negative pole of which is connected to the cathode. It is evident that the strength of the magnetic field and the value of the high tension will have to be appropriate, either to the size of the cavities 5 in the case of Fig. 3, or to the dimensions and to the geometrical arrangement of the claws 14 and 14' in the case of Fig. 4.

The apparatus illustrated in Fig. 4 is particularly advantageous when ultra-short waves are to be propagated in a guide. All that is necessary is to introduce the magnetron into the interior of an adjustable cavity adapted to the guide, in order to obtain an emission of very high frequency waves.

With the apparatus of Fig. 3 the withdrawal of power for utilization is effected, as is usual in the art, by introducing into one of the cavities 5 a small loop of conducting wire.

Figure 5A:
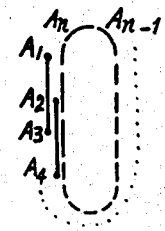
Fig. 5a and Fig. 5b are diagrammatic views showing the manner of interconnecting the anode segments within a magnetron in accordance with the principles of our invention.

In the case of Fig. 3, it is easy to obtain the mode of vibration $\pi$, that is to say, a distribution of field such that in two adjacent cavities the oscillatory elongations will at every instant be equal in absolute value, but of opposite signs. In order to attain this result, highly conducting connectors or straps are provided, uniting in twos the anode segments such as $A_1$, $A_2$ etc., which are to be at every instant at the same high frequency potential. For example in Fig. 3, $A_1$ is connected to $A_3$, $A_2$ to $A_4$, and so forth, the odd segments of the anode segments $A_1$, $A_3$ . . . being so connected each to the other and the even segments $A_2$ $A_4$ . . . being connected each to the other in the same manner, all around, $A_n$ being connected to $A_2$ and $A_{n-1}$ to $A_1$. Fig. 5a shows diagrammatically this method of connection, the anode segments being represented by their edges.

Figure 5B:
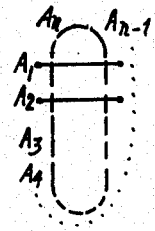

It would likewise be possible to connect the expansions opposite to one another, as indicated in Fig. 5b.

In the case of Fig. 4, the equalization of the potentials should be establishd between the lateral sides of each plate of the anode, by means of connections such as A—B, A'—B', and so on, distributed in sufficient numbers.

Fig. 10 is a cross-sectional view taken on line 10—10 of Fig. 9. Reference character 1 designates a block anode and reference character 4 shows slots arranged in its mass and terminating by resonators 5, these slots separating the anode in a plurality of anodic segments or elements. Reference character 2 designates a flat cathode presenting two coplanar emitting surfaces heated by a spirally wound heater 3 located inside the cathode and connected on its one end to the cathode. The anode forms a tight envelope closed by laterally mounted covers 6—6. L1—L2 designate terminals leading in the heating current. L3 is the terminal to connect the + pole of the supply to the anode, the − pole being connected to the cathode, and L4 designates the terminal leading out the tube oscillating power to the appropriate output circuit. The magnetic system is designated by M—M. The magnetic system produces a flux parallel to the tube axis.

Fig. 10 represents a section transverse to the aforesaid axis, whereas Fig. 9 represents a section containing this axis.

Fig. 11 shows the tight envelope C through which the leads extend to two anode jaws, and to the heater to which the cathode is connected inside of the tube.

Finally it may be pointed out that the main advantages of magnetrons constructed according to this invention, as compared with existing devices, are the following:

(1) The surface area for the dissipation of heat from the anode is increased without increasing the interval between the anode and the cathode, thereby rendering it possible, with electrodes of large dimensions, to obtain at the same time large powers of very high frequencies;

(2) It is easy to construct the cathode of a plurality of parts, certain parts furnishing the primary electrons for starting, and the other parts being merely for the emission of secondary electrons;

(3) By increasing the surface area of the cathode, the current density delivered by it remains small for a large total current, which is particularly valuable in the case of magnetrons operating by impulsions, with high instantaneous current strengths.

We claim:

1. A magnetron comprising a single flat cathode having two opposite flat electron emitting surfaces, a single anode symmetrically surrounding said cathode and presenting two coplanar surfaces parallel and opposite to said emitting surfaces and closed laterally forming a continuous interaction space between said anode and cathode, the said anode including a plurality of resonant cavities, the said cavities opening into the interaction space by apertures regularly provided in the said two coplanar surfaces of said anode, opposite to the said emitting surfaces and a magnetic system located adjacent said interaction space to produce magnetic flux crossing the said interaction space between said anode and cathode surfaces parallel to the axis of said anode and cathode.

2. A magnetron comprising a single flat cathode having two opposite flat emitting surfaces, a single anode symmetrically surrounding said cathode and presenting two coplanar surfaces parallel and opposite to said emitting surfaces and terminating laterally in a cylindrical surface forming a continuous closed anode-cathode interaction space, the said anode including a plurality of resonant cavities, the said cavities opening into the interaction space by apertures regularly provided in the said two coplanar surfaces of said anode opposite to the said emitting surfaces and magnetic means adjacent said interaction space to produce a flux crossing the said interaction space parallel to the cathode surfaces.

HENRI GUTTON.
JEAN LEGROS.

REFERENCES CITED

The following references are of record in the file of this patent:

UNITED STATES PATENTS

| Number | Name | Date |
|---|---|---|
| 2,188,410 | Linsell | Jan. 30, 1940 |
| 2,409,038 | Hansell | Oct. 8, 1946 |
| 2,428,612 | Blewett | Oct. 7, 1947 |
| 2,432,466 | Burns | Dec. 9, 1947 |
| 2,477,122 | Garner | July 26, 1949 |